Nov. 19, 1968 H. H. HAMLIN 3,411,795
SEALING DEVICE FOR HIGH TEMPERATURE INPUT NOZZLE
Filed March 22, 1966

INVENTOR.
HALLEY H. HAMLIN
BY H. H. Losche
Paul S. Collignon
ATTYS.

United States Patent Office 3,411,795
Patented Nov. 19, 1968

3,411,795
SEALING DEVICE FOR HIGH TEMPERATURE INPUT NOZZLE
Halley H. Hamlin, Lyndhurst, Ohio, assignor to the United States of America as represented by the Secretary of the Navy
Filed Mar. 22, 1966, Ser. No. 538,162
1 Claim. (Cl. 277—74)

ABSTRACT OF THE DISCLOSURE

A sealing device having a spring biased cylindrical sealing element with a passageway therethrough for connecting a stationarily mounted nozzle to a rotating element of an engine and having a pliable washer engaging said nozzle and said cylindrical sealing element for preventing escapement of high temperature gases flowing through said passageway.

---

The present invention relates to sealing means for connecting a rotating member of an engine, such as a barrel engine, to a stationary source of hot pressurized gas.

Barrel engines of the wobble plate or swashplate type, which are driven by hot pressurized gases, are presently being used in various military applications, such as for prime movers for propulsion of naval torpedoes. Barrel engines have the advantage of providing high horsepower to weight and volume ratio, and also provide relatively low speed propulsion which eliminates the requirement for gear boxes or other speed reducers.

A typical barrel engine adaptable for a propulsion unit for naval torpedoes includes an outer housing and an inner shaft which are coaxially mounted relative to each other and adapted to establish relative rotation. A fluid pressure inlet is positioned coaxially with respect to the housing and inner shaft and is connected to the outer housing. The motive power assembly includes a plurality of pistons reciprocally mounted in the housing with their stroke axis parallel to the axial center of rotation. The motive power assembly is constructed and arranged to translate fluid pressure entering through the inlet into an axial force component. Such an engine adaptable for a propulsion unit for torpedoes is described in U.S. Patent 3,151,527, entitled, Barrel Engine, which issued Oct. 6, 1964, to the inventor of the present invention.

In the aforesaid patent, hot gas, or other suitable fluid, flows from a combustion chamber into a tubular conduit and a hot gas seal assembly, and then enters into and through a rotary valve assembly. The hot gas seal assembly includes a sealing member, encased by an annular steel sleeve, movable within a hot gas nozzle to provide the fluid communication means between the hot gas supply chamber and the rotary valve assembly. The sealing member is substantially tubular and preferably made of heat resistant material such as graphite. The stainless steel sleeve is in essence a protective casing around the sealing member. The seal and the surrounding sleeve are tightly attached to each other and are movable within a tubular passageway of a nozzle. The sealing member is keyed to the hot gas nozzle by installing a pin in the wall of the hot gas nozzle, the pin projecting inwardly through the wall of the sealing member. A rectangular slot is cut into the outer circumference of the sealing member for engagement with the pin, and the slot thus enables axial movement but prevents any rotary motion. A spring member concentrically surrounds a feed tube within the passageway of the hot gas nozzle and the spring is positioned to engage an interval annular shoulder of the nozzle and reacts against an inwardly extending flange portion of the sleeve thereby biasing the hot gas seal to maintain contact between the sealing members and the conical valve head.

The sealing assembly of the aforesaid patent provides satisfactory sealing up to pressures of approximately 1200 pounds per square inch. While pressures up to this amount are satisfactory for some applications, it is highly desirable to frequently operate engines at a much higher pressure. It is an object of the present invention to provide a seal of minimum size which is capable of operating at gas pressures up to 3000 pounds per square inch.

The seal assembly of the present invention is comprised of a cylindrical sealing element which is made from a heat resistant metal, such as stainless steel. The outer diameter of the cylindrical sealing element slidably engages, with a close fit, the bore of a nozzle member. One end of the sealing element is provided with a reduced diameter portion, and a slot is cut in this reduced diameter portion for engagement with a pilot pin that is attached to the nozzle member. The pilot pin prevents the sealing element from rotating with respect to the nozzle member, but permits relative axial movement. The larger end of the sealing element is provided with a smooth surface which is engageable with an encapsulated ring of graphite material in the face of a rotary valve, thereby providing a leak-tight and low friction contact between the sealing element which is nonrotatable and the valve which is rotatable.

Due to the reduced diameter portion of the sealing element, there is a very short engagement between the outer diameter of the sealing element and the inner diameter of the nozzle member, and this short engagement permits pivotal motion of the sealing element whereby its end follows any irregular movements of the encapsulated ring. Initial contact between the sealing element and the encapsulated ring of graphite material is provided by a helical coiled spring which is mounted within the nozzle member. However, during operation, gas pressure in the nozzle member acts on the end of the sealing element to hold it against the encapsulated ring of graphite with a force directly proportional to the pressure of the gas. This force due to the gas pressure is sufficient to maintain effective sealing between the sealing element and the encapsulated ring of graphite and the force of the spring is no longer needed. Accordingly, gas at a high temperature which will destroy the elasticity of the spring can be tolerated. In order to prevent escapement of gas through the clearance space provided between the sealing element and the nozzle member, an extruded washer of soft material, such as copper, is provided to grip the outer surface of the sealing element and the washer is clamped to the nozzle member by a ring that threadedly attaches to the nozzle member.

It is therefore a general object of the present invention to provide an improved sealing assembly for an input nozzle on a barrel engine.

Another object of the present invention is to provide a sealing assembly that will operate at extremely high pressure and temperature.

Other objects and advantages of the present invention will be readily appreciated as the same becomes better understood by reference to the following detailed description when considered in connection with the accompanying drawing wherein.

Figure 1:
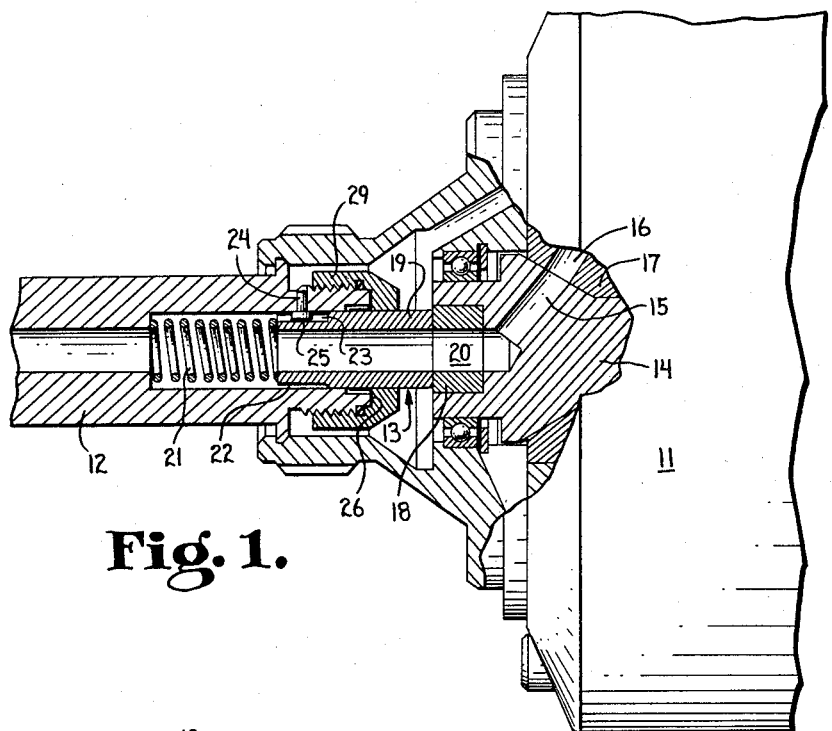
FIGURE 1 is a side view of a barrel engine, partially broken away to show a sealing assembly.

Referring now to the drawing, FIGURE 1 shows a barrel engine 11 that is operated by pressurized gas that is fed from a source (not shown) through a nozzle 12 that communicates through a seal assembly 13 to a valve 14. Valve 14 is rotatably mounted within barrel engine 11 and has a port 15 that selectively communicates with a plurality of ports 16 in valve seat 17. The plurality of ports in valve seat 17 lead to a plurality of cylinders in the barrel engine. An encapsulated ring 18 of low friction material, such as graphite, is provided on the front face of valve seat 17 and is rotatably with valve seat 17.

Figure 2:
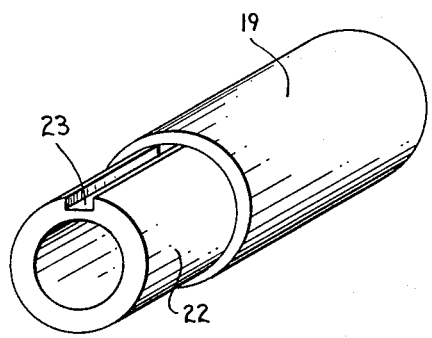
FIGURE 2 is a perspective view showing a sealing element.

A sealing element 19, having a passageway 20 therein, is slidably fitted within the bore of nozzle 12 and is biased against ring 18 by means of a helical coiled spring 21 that is positioned within the bore of nozzle 12. As best shown in FIGURE 2 of the drawing, sealing element 19 is provided with a reduced diameter portion 22 and a slot 23 is provided in the reduced diameter portion 22. A pilot pin 24 is provided in a hole in nozzle 12, and foot 25 on pin 24 engages slot 23 in sealing element 19.

Figure 3:
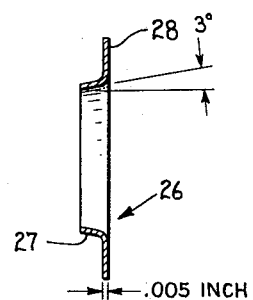
FIGURE 3 is a sectional view of a metallic seal.

Referring particularly to FIGURES 1 and 3 of the drawing, a washer 26, having a tapered hub 27 and a flange 28, is provided around the periphery of sealing element 19, with tapered hub 27 gripping the circumference of sealing element 19. Washer 26 is made of soft, thin material, such as copper, and is pliable to permit any desired motion of sealing element 19 that might be imparted by any wobbling of valve 14. Ring 29, which is threadedly attached to the outer periphery of nozzle 12, firmly clamps flange 28 to nozzle 12. Thus it can be seen that washer 26 prevents any escaping of gas through the clearance space between sealing element 19 and nozzle 12.

In operation, spring 21 biases sealing element 19 against ring 18 until the pressurized gas enters nozzle 12, whereupon the gas impinges against the end of sealing element 19 with sufficient force so that the biasing action of spring 21 is no longer needed. As the intended use of the present invention is with a high temperature gas, the elasticity of the spring will be destroyed, but in use, such as in a torpedo, the entire motor is expendable and operates only one time. The pressurized gas causes the barrel engine to be operated, and valve 14 is rotating during operation, however, pin 24 prevents any rotation of sealing element 19. Thus there is friction between encapsulated ring 18 and the end of sealing element 19, but the friction is not excessive, as ring 18 is made of a low friction material, such as graphite. As sealing element 19 is provided with a reduced diameter portion 22, there is a relatively short length of sealing element 19 that is in contact with the bore of nozzle 12, and as there is a small amount of clearance between the outer diameter of sealing element 19 and the bore of nozzle 12 there can be some radial play in sealing element 19, thereby assuring that the end of sealing element 19 is maintained in contact with ring 18. The escaping of gas through the clearance space between sealing element 19 and the bore of nozzle 12 is prevented by washer 26 which is in contact around the circumference of sealing element 19.

It can thus be seen that the present invention provides an improved sealing assembly for a stationary nozzle that feeds high temperature gases to a rotating element. Obviously many modifications and variations of the present invention are possible in the light of the above teachings. It is therefore to be understood, that within the scope of the appended claim, the invention may be practiced otherwise than as specifically described.

What is claimed is:

1. A high pressure sealing device for a stationarily mounted nozzle for transferring a high temperature and high pressure gas from a combustion chamber to a rotating element of an engine comprising:

a single cylindrical sealing element having a passageway therethrough and being slidably mounted within an enlarged bore portion of said nozzle, said single cylindrical sealing element having a reduced diameter portion extending into said enlarged bore portion of said nozzle whereby a relatively short length of said single cylindrical sealing element is in contact with the inner surface of said enlarged bore portion of said nozzle thereby permitting slight pivotal motion of said cylindrical sealing element, and the entire end of said reduced diameter portion being in the line of flow of said high temperature and high pressure gas, a helical spring positioned within said enlarged bore portion of said nozzle for biasing the other end of said single cylindrical sealing element against said rotating element until said high temperature gas impinges on the reduced diameter end of said cylindrical sealing element thereby applying a force which provides additional biasing of said other end of said cylindrical sealing element against said rotating element, a pliable metallic washer having a flange and a tapered hub, said tapered hub being in engagement with a portion of the outer periphery of said cylindrical sealing element, and means engaging said nozzle for attaching said flange of said pliable metallic washer to said nozzle whereby said washer prevents escapement of said high temperature gas between the outside diameter of said cylindrical sealing element and the inside diameter of said nozzle.

References Cited

UNITED STATES PATENTS

| | | | |
|---|---|---|---|
| 2,583,777 | 1/1952 | Jacobsen | 277—85 |
| 3,056,387 | 10/1962 | Budzich | 91—175 |
| 3,136,558 | 6/1964 | Wade | 277—85 X |
| 3,151,527 | 10/1964 | Hamlin | 91—175 |

SAMUEL ROTHBERG, *Primary Examiner.*